United States Patent

[11] 3,623,768

| [72] | Inventors | Erwin L. Capener<br>San Jose;<br>Julius Roth, Portola Valley, both of Calif. |
|---|---|---|
| [21] | Appl. No. | 61,273 |
| [22] | Filed | Aug. 5, 1970 |
| [45] | Patented | Nov. 30, 1971 |
| [73] | Assignee | Stanford Research Institute<br>Menlo Park, Calif. |

[54] VEHICULAR SAFETY SEAT
4 Claims, 4 Drawing Figs.

[52] U.S. Cl. .................................................. 297/390,
280/150 AB, 280/150 SB
[51] Int. Cl. ........................................................ A62b 35/60
[50] Field of Search .......................................... 297/390,
384, 385; 280/150 SB

[56] References Cited
UNITED STATES PATENTS

| 2,873,122 | 2/1959 | Peras | 297/384 X |
| 3,173,722 | 3/1965 | Carbonetti | 297/390 X |
| 3,430,979 | 3/1969 | Terry et al. | 297/384 |

*Primary Examiner*—James T. McCall
*Attorneys*—Donovan J. De Witt and Gregg, Hendricson & Caplan ABSTRACT: A vehicular safety seat having a seat portion, a backrest provided with a pair of movably mounted arms having forward portions which, on severe vehicular impact, are driven inwardly under pressure of released gases to a body-restraining position adjacent the torso of an occupant of the seat and immediately over his thighs, at least one of said arms carrying adjacent the forward end thereof a folded air bag which is simultaneously inflated by said gases to provide a protective pillow between the chin and the thighs of the occupant which does not obstruct his vision. The pillow deflates and the arms are retracted to a nonprotective position immediately upon cessation of the impact, thereby affording unrestricted movement on the part of the seat occupant.

ERWIN L. CAPENER &
JULIUS ROTH
INVENTORS

BY Donovan J. DeWitt
ATTORNEY

ERWIN L. CAPENER &
JULIUS ROTH
INVENTORS

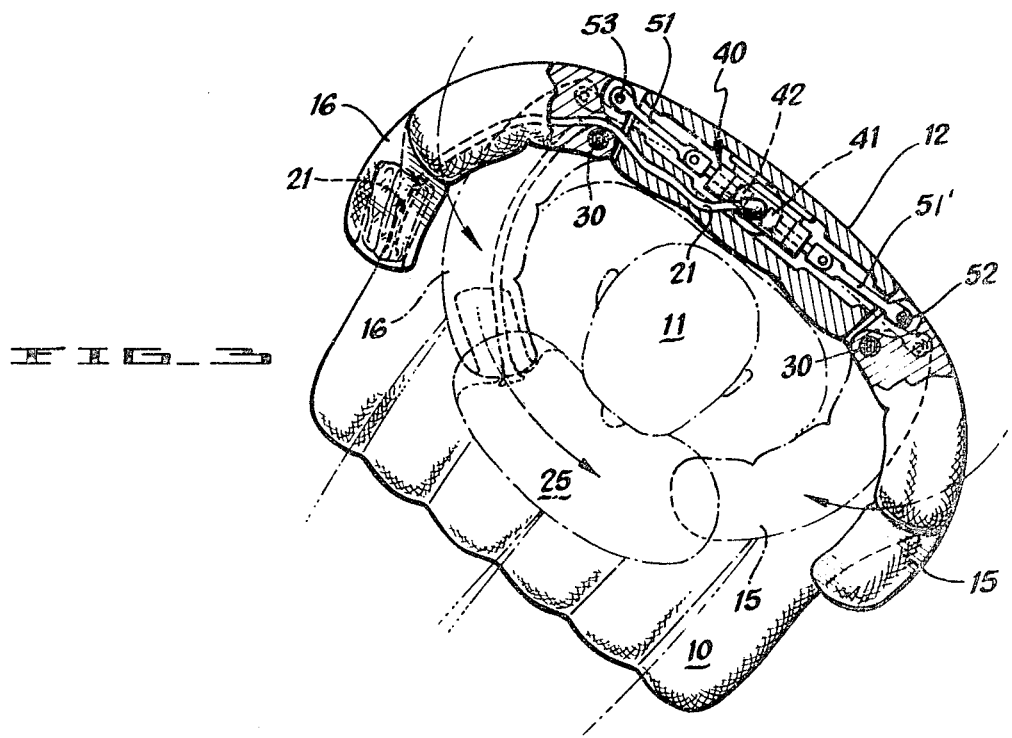
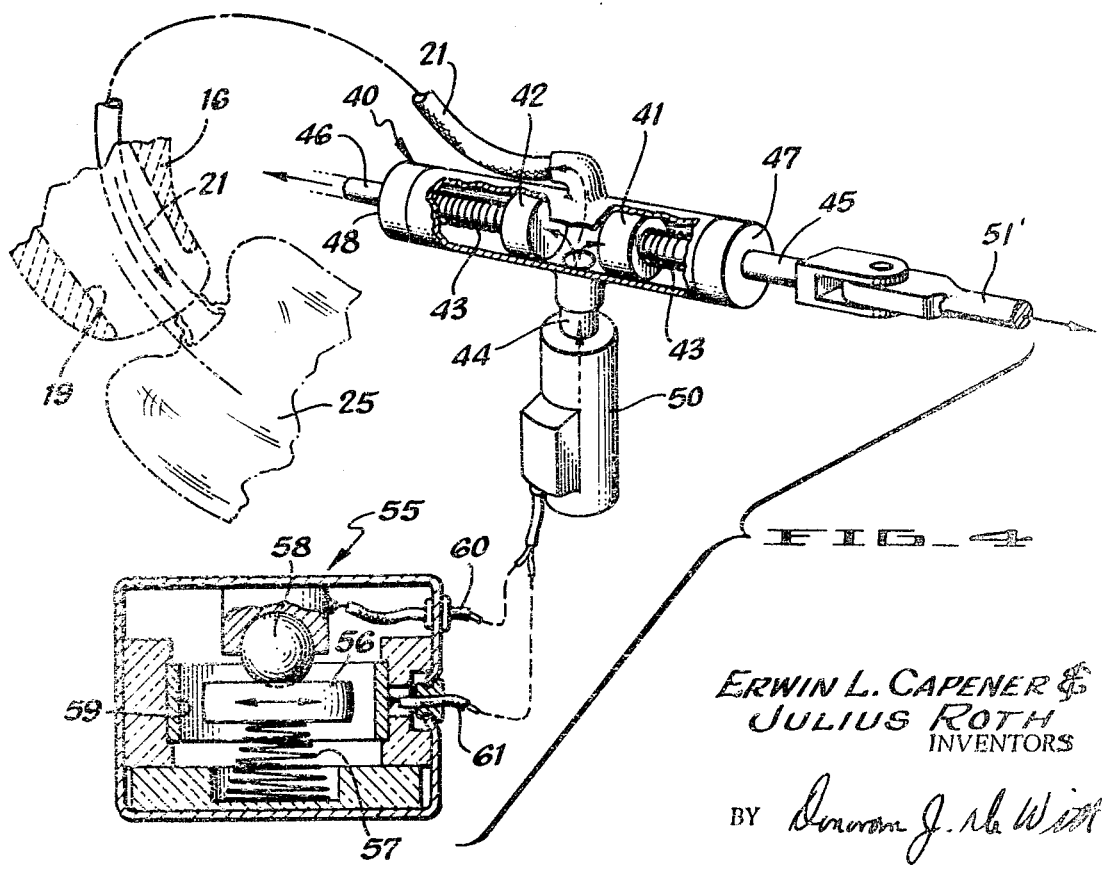

VEHICULAR SAFETY SEAT

BACKGROUND OF THE INVENTION

A wide variety of body-restraining, safety devices for use in vehicles have been developed. Seat belts of both the lap and shoulder variety are now commonly installed in automobiles, and when actually used, provide a significant measure of protection. However, it is acknowledged that many occupants of the vehicle will not take the trouble to fasten the belts, and it would be therefore desirable if automatically actuated restraining means were available which could effectively maintain the occupant in the seat in the event of a collision. It is an object of the present invention to provide restraining means of this character.

It has also been proposed to supplement the protection afforded by seat belts with an air bag which instantly inflates to a pillow in a position ahead of the occupant as a collision occurs. Such bags have been mounted in various fixed locations such as on the instrument panel, in the hub of the steering wheel or on the back of the front seat, the latter mounting being for the protection of rear seat passengers. One of the disadvantages of prior art inflated bags is the relatively large size which they must assume upon inflation to be effective. Thus, the inflated bags obstruct the view of the vehicle occupants, with the obvious attendant disadvantages. Again, inflation of the several bags each containing a large volume of gas can raise the air pressure within the vehicle in such an amount as to injure the ear drums, particularly when the vehicle is travelling with its windows in a raised position. It is a further object of this invention to provide an inflatable bag structure which does not pose lack of vision or raised pressure hazards, and which is so positioned with respect to the occupant as to provide an enhanced protective effect.

nature of still other objects of the invention will be apparent from a consideration of the descriptive portion to follow.

SUMMARY OF THE INVENTION

It has been discovered that the foregoing objects of the invention can be achieved by the provision of an individual safety seat incorporating a seat portion, a backrest provided with a pair of movably mounted arms having forward portions which extend in a generally forward direction along the respective sides of an occupant of the seat at substantially the level of an arm rest, and gas-powered arm control means adapted to forcibly swing the forward portions of said arms inwardly to a body-restraining position adjacent the torso of the occupant and immediately over his thighs under pressure of gas from a gas supply device as released upon impact of predetermined force on the vehicle, and then quickly to retract the arms to the nonrestraining position. An inflatable air bag is preferably mounted adjacent a forward portion of one of the arms and is inflated by the released gases as the arms are being moved into the torso-restraining position. The pillow deflates as the arms are retracted.

To provide the force required to move the arms into a body-restraining position and to maintain the latter for the critical period during which the body is thrown against the arms, the vehicle is equipped with a gas supply device which can be either a gas generator (i.e., a rocket) or a cylinder of compressed gas. In the preferred embodiment of this invention, a device of this character is incorporated in each seat of the vehicle, though a common gas supply source could be utilized. Whatever the nature of the gas supply device employed, the unit is one which sends a stream of pressurized gas to the arm control means when actuated, or triggered, by a sensor device mounted on the vehicle which responds to vehicular impact of predetermined force. The resulting escaping gases, working against piston means incorporated in the arm control unit, cause the arms to so rotate as to move the forward positions thereof inwardly against the torso of the seat occupant and thus restrain its movement in either a forward, upward or sideward direction for the critical duration of the impact, which is normally less than one second. At the end of this critical period, resilient means incorporated in the arm control structure override the by now greatly reduced gas pressures and return the arms to the nonrestraining position.

In the preferred form of the invention, at least one of the arms carries adjacent its forward end a folded air bag which is simultaneously inflated by the escaping gas on impact of the vehicle as the arms of the seat are being brought toward one another in front of the occupant. The resulting inflated pillow opens immediately in front of the passenger from thigh to chin level without impairing his vision. Further, the volume of gas in this pillow is relatively small, and the simultaneous inflation of all the pillows in the vehicle gives rise to no appreciable overall pressure increase even when all the windows are closed. Each pillow returns to a noninflated condition as soon as the force of the gas stream is exhausted, the period in which the bag remains fully inflated being less than one second in most instances.

While the arms of the seat on being transiently forced into a body-restraining position will protect the passenger in the event of a strong impact upon the vehicle, it is contemplated that the seat may also be provided with a conventional safety belt which will protect the passenger from injury in more casual circumstances such as when the vehicle is rapidly braked to a stop. The seat may also be provided with a head support as well as other conventional safety and comfort features.

Invention further resides in the combination, construction and arrangement of parts illustrated in the accompanying drawings, and while there is shown therein a preferred embodiment of the invention, it is to be understood of the same is merely illustrative of the invention which comprehends other details of construction without departing from the spirit thereof or the scope of the appended claims.

Referring to the drawings.

FIG. 3 is a plan view of the seat showing the arms in both a retracted position and, in dotted outline, a body-restraining position, with a portion of the back being broken away to show details of constriction of the arm controlling means; and FIG. 4 is a view in perspective, to an enlarged scale, of the gas generating and arm control means associated with a sensor apparatus adapted to trigger release of gases on a vehicular impact of predetermined force.

Figure 1:
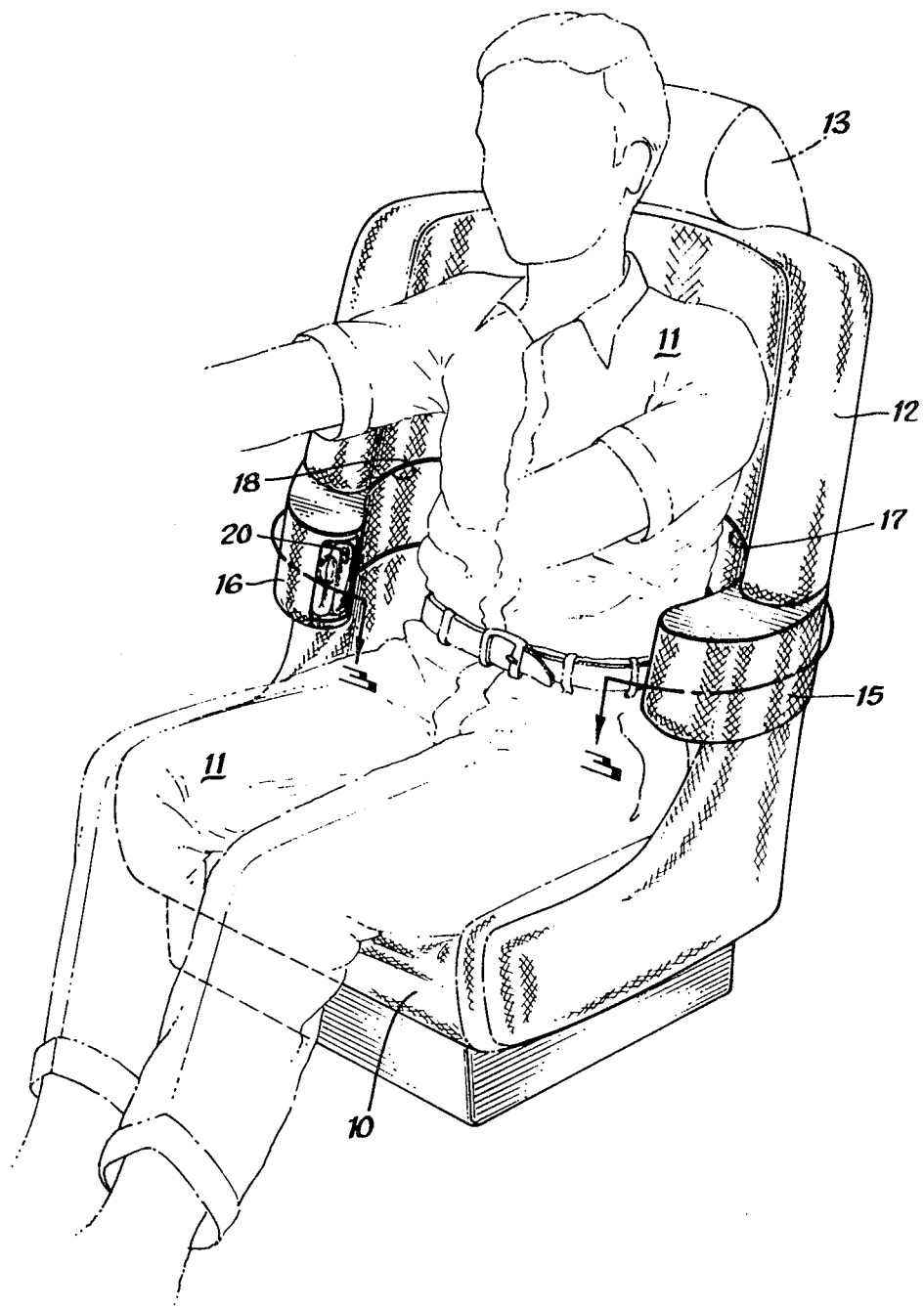
FIG. 1 is a view in perspective showing the safety seat of the present invention with an occupant therein and with the arms of the seat positioned in the normal, or retracted position.
Figure 2:
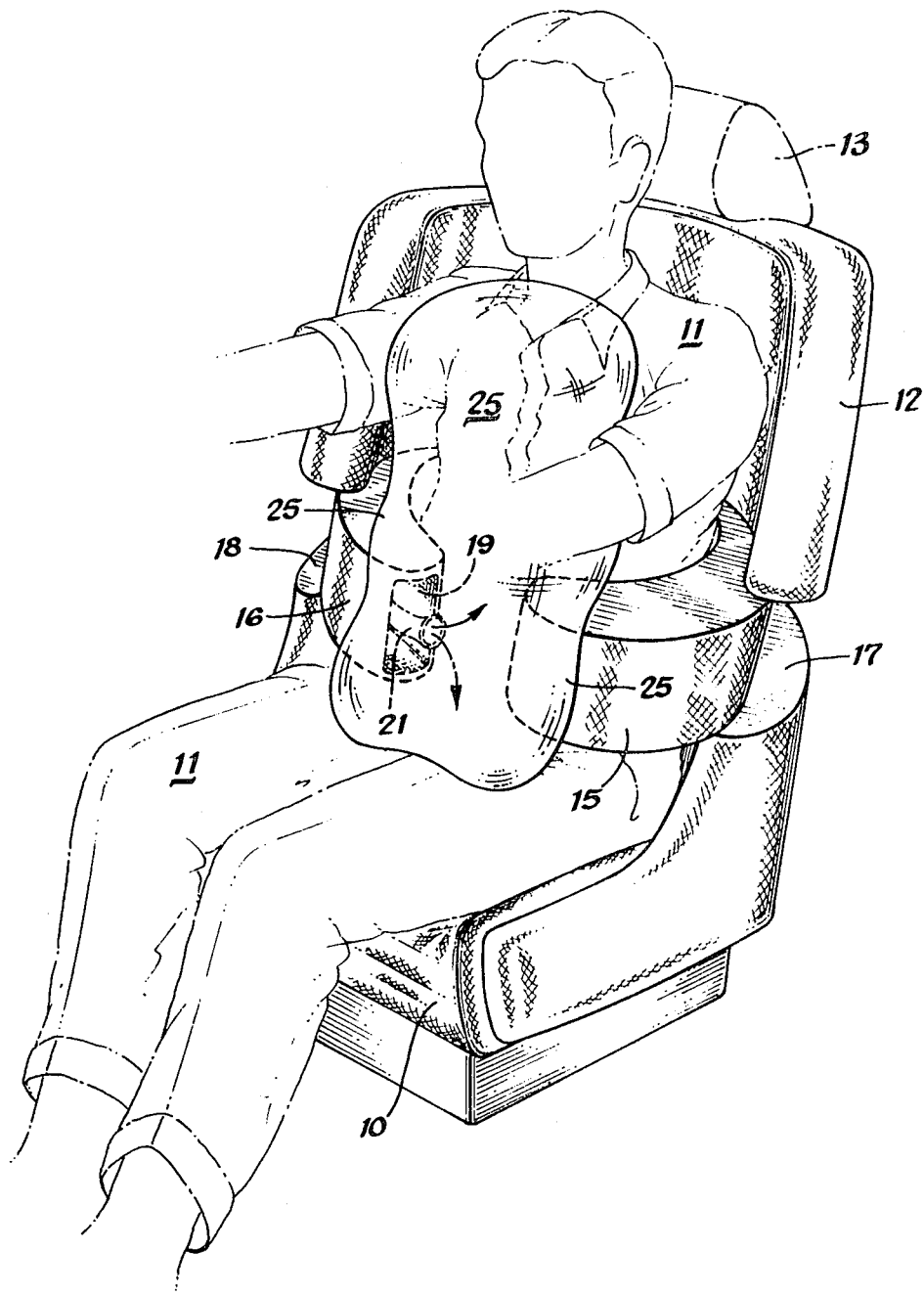
FIG. 2 is a view similar to that of FIG. 1, but with the arms now moved inwardly to a body-restraining position and with a gas bag attached to one of the arms being inflated in front of the passenger.

Referring more particularly to the drawings, there is shown in FIGS. 1 and 2 a safety seat embodying the features of the present invention and including a seat portion 10 on which is shown a passenger 11, a back 12, a head support 13 mounted atop the back, and arms 15 and 16 movably mounted in apertures 17 and 18 provided in opposite side margins of the back. In FIG. 1 the arms 15, 16 are shown in a retracted position, with the forward portion of each arm extending in a generally forward direction along the sides of the passengers at waist level. An inflatable air bag 20 with its connecting hose 21 is shown as mounted within a cavity 19 in the forward end of arm 16.

In FIG. 2, the air bag 20 is shown as inflated to provide an air pillow 25 which extends from the thighs of the seat occupant to approximately the level of his chin, the top of the pillow remaining below the passenger's eye level. This figure also shows the arms in an inwardly rotated, torso-restraining position which keeps the passenger from moving in a forward, sideways or upward direction. The passenger's head is cushioned by pillow 25 should it snap ahead on the vehicular impact.

In FIG. 3, which shows the arms 15, 16 in solid line in the retracted position of FIG. 1 and in dotted line in the restraining position of FIG. 2, the back 12 has been cutaway to show the mounting of the arms in the back and the arm control means associated therewith. Each of the arms 15, 16 pivots about a vertical pin 30 which is set within adjacent back portions above and below the apertures 17, 18. As seen in FIGS. 3 and 4, the arm control means includes a hollow cylinder 40 within which are carried opposed pistons 41 and 42 which are inwardly biased by a pair of compression springs 43 which serve to force the pistons together as arms 15 and 16 are brought from a restraining to a retracted position. The central portion of cylinder 40 between the pistons is in communication with a tube 44 connected to a gas generating device 50. This device comprises a gas generating rocket which, on severe vehicular impact, receives from the sensor apparatus 55 an electrical signal which ignites the rocket propellent and provides the steam of pressurized gases required to overcome the force of springs 43 and move the pistons 41 and 42 outwardly within the cylinder 40. The gas from the rocket, on entering chamber 40 also passes in part through the tube 21 to inflate the pillow 25.

The movement of pistons 41, 42 is transmitted to the seat arms 15, 16 through a linkage made up of rods 45 and 46 which extend through openings in the respective ends 47 and 48 of cylinder 40 and are pivotally connected to cranks 51 and 51'. The outward ends of the cranks ore pivotally secured to crank pins 52 and 53 set vertically within the respective arms 15, 16 in a position parallel to, but displaced outwardly from the pins 30 about which the arms pivot. FIG. 3 in solid line shows the pistons 41, 42 in the retracted position as held by spring 43, and in dotted line as being in the outwardly driven position which forces the seat arms inwardly to the body-restraining position, the inflated pillow 25 also being shown in dotted outline The condition in which the bag is inflated and the arms are in the restraining position lasts for but a brief interval of time, usually less than a second. Thus, by the time the shock of the impact is over, the pressure of the gas stream from rocket 50 will have fallen off and gas in the cylinder 40 will also have leaked by the pistons which are loosely fitted within the walls of the cylinder to facilitate rapid return of the cylinders and thus of arms 15, 16 to the retracted position. Simultaneously, pillow 25, being relatively pervious to the inflating gas, assumes the deflated condition. The movements of the occupant in the seat are then no longer impeded and he is in a position to leave the vehicle.

The sensor device 55 shown in FIG. 4 is one which generates a signal in the event of a severe impact to the vehicle coming from any direction about its horizontal periphery. It includes a weight 56 which normally is maintained in the center position, as shown, under the force of a spring 57 which presses the weight against a ball 58 which seats in a pocket on the upper surface of the weight. When the vehicle undergoes a severe impact (usually one of at least about 5Gs) the restraining action exerted by the spring is overcome and weight 56 can make contact in a horizontal plane in any direction with the surrounding annular contact member 59. Such contact has the effect of closing the electrical circuit between wires 60 and 61 and thus of sending the igniting charge to rocket 50. The source of electrical current for the signal generated by the sensor is not shown.

It is to be noted that the pillow 25 inflates to a position between the body of the seat occupant and the portion of the vehicle structure lying ahead, namely, the front dash, steering wheel or the rearward portion of the front seat. The pillow is thus adapted to absorb most of the impact forces upon the body and thus prevent the body from hitting the car structure. The seat arms, when in the crash-restraining position, serve primarily to prevent sideways or upward ejection of the occupant, while also restraining his forward motion.

We claim:

1. A vehicular safety seat for an individual passenger comprising,
   a seat portion,
   a back rest,
   a pair of arms movably mounted on opposite sides of the back rest and projecting therefrom in a generally forward direction at substantially the level of arm rests, and
   arm control means adapted to maintain the arms in a nonrestraining position under normal driving conditions and to move the arms into a body-restraining position adjacent the torso of the seat occupant and over his thighs when actuated by the flow of gases from a gas supply device as triggered by a sensor on impact of a predetermined force on the vehicle.

2. A seat as recited in claim 1, wherein a gas inflatable bag is carried adjacent a forward portion of at least one of the arms.

3. A seat as recited in claim 2 wherein the gas supply device is positioned within the seat and wherein the gases released therefrom on impact of the vehicle flow to the arm control means to actuate the movement of the arms to the restraining position as well as to the bag to inflate the same.

4. A seat as recited in claim 3 wherein both the arm control means and the pillow are provided with gas escape means permitting the pillow to deflate and the arms to be returned to the nonrestraining position as soon as the impact on the vehicle is over, thereby permitting an occupant of the seat to leave the same.

* * * * *